United States Patent
Combs et al.

(10) Patent No.: US 7,863,764 B2
(45) Date of Patent: Jan. 4, 2011

(54) POWERTRAIN WITH TORQUE CONVERTER-MOUNTED GENERATOR FOR MULTIPLE VOLTAGE ELECTRICAL POWER AND METHOD FOR ASSEMBLING SAME

(75) Inventors: Robert Franklin Combs, Mulberry, IN (US); David J. Sagers, Indianapolis, IN (US); Leroy K. Johnson, Brownsburg, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 573 days.

(21) Appl. No.: 11/856,755

(22) Filed: Sep. 18, 2007

(65) Prior Publication Data

US 2009/0071784 A1 Mar. 19, 2009

(51) Int. Cl.
*H02P 9/04* (2006.01)
(52) U.S. Cl. ............... 290/32; 310/112; 310/179
(58) Field of Classification Search .......... 290/32; 477/3; 310/112, 113, 114, 68 R, 179, 180, 310/184, 216.109
See application file for complete search history.

(56) References Cited

U.S. PATENT DOCUMENTS

| | | | |
|---|---|---|---|
| 4,550,267 A * | 10/1985 | Vaidya | 310/184 |
| 4,945,296 A * | 7/1990 | Satake | 318/538 |
| 5,103,127 A | 4/1992 | Peter | |
| 5,864,198 A * | 1/1999 | Pinkerton | 310/266 |
| 6,208,036 B1 | 3/2001 | Evans et al. | |
| 6,703,739 B1 * | 3/2004 | Schutt et al. | 310/96 |
| 6,750,588 B1 * | 6/2004 | Gabrys | 310/268 |
| 6,787,931 B2 * | 9/2004 | Nakagawa et al. | 290/31 |
| 7,030,533 B2 * | 4/2006 | Umeda | 310/184 |
| 7,034,509 B2 * | 4/2006 | Kusko | 322/90 |
| 7,397,156 B2 * | 7/2008 | Mukai et al. | 310/112 |
| 2005/0258707 A1 * | 11/2005 | Shteynberg et al. | 310/218 |
| 2008/0174195 A1 * | 7/2008 | Tupper et al. | 310/179 |

FOREIGN PATENT DOCUMENTS

| JP | 01255460 A | * | 10/1989 |
|---|---|---|---|
| JP | 05268752 A | * | 10/1993 |

* cited by examiner

*Primary Examiner*—Julio Gonzalez
(74) *Attorney, Agent, or Firm*—Quinn Law Group, PLLC

(57) ABSTRACT

A torque converter-mounted generator is provided that, along with power electronics, offers at least two types of electrical power output and may be attached to a transmission without impacting the axial length of a powertrain in comparison to a powertrain with an identical transmission and a torque converter not having a generator mounted thereto. Different torque-converter mounted generators and power electronics configurations providing different combinations of electrical power voltages may be offered for use with a given transmission type, thus allowing flexibility in meeting customer needs without unduly impacting assembly of the powertrains. A method of assembling transmissions is also provided.

6 Claims, 3 Drawing Sheets

US 7,863,764 B2

POWERTRAIN WITH TORQUE CONVERTER-MOUNTED GENERATOR FOR MULTIPLE VOLTAGE ELECTRICAL POWER AND METHOD FOR ASSEMBLING SAME

TECHNICAL FIELD

The invention relates to a powertrain with a torque converter-mounted generator and to a method of assembling powertrains.

BACKGROUND OF THE INVENTION

Motor vehicles, especially those of the military or commercial type, often include power take-off units or add-on devices connected with the vehicle engine and transmission for providing electrical power for external or "offboard" uses such as powering industrial equipment or tools. Such power take-off units and add-on devices require a significantly time-consuming installation process. Additionally, the overall axial length of the transmission is typically increased significantly with the incorporation of these devices into the vehicle powertrain. The application of a specific type of transmission by different customers varies widely, as does onboard and offboard power needs.

SUMMARY OF THE INVENTION

A torque converter-mounted generator is provided that, along with power electronics, offers at least two electrical power output voltages and may be attached to a transmission without impacting the axial length of a powertrain in comparison to a powertrain with an identical transmission and a torque converter not having a generator mounted thereto. Different torque-converter mounted generators and power electronics configurations providing different combinations of power output voltages may be offered for use with a given transmission type, thus allowing flexibility in meeting customer needs without unduly impacting assembly of the powertrains.

Specifically, a powertrain within the scope of the invention includes a transmission housed within a transmission housing, and a torque converter operatively connected with the transmission and housed within a torque converter housing. The torque converter housing is secured to the transmission housing. A generator with a rotor is secured to the torque converter. The generator also has a stator that is secured to the torque converter housing. Power electronics are operatively connected with the generator. The generator and power electronics are configured to provide electrical power at multiple voltages. Voltage may be a relatively low voltage required for powering onboard vehicle accessories, while another voltage may be at a relatively high voltage for offboard power needs. As used herein, "onboard" refers to components normally connected with the vehicle at all times, including when the vehicle is in motion, while "offboard" components are those not integral with the vehicle and typically connected to the vehicle only when it is stationary.

In some embodiments, the generator may generate electrical power at two or more different voltages, such as if the stator includes first and second sets of stator segments adapted to provide the two different electrical voltages. Alternatively, the generator may generate electrical power at only one voltage that is then converted to different voltages for electrical power output by different components of the power electronics.

In one embodiment, the power electronics are configured to provide electrical power to the stator to drive the rotor, thereby operating the generator in a motoring mode for starting the engine and/or providing torque to the transmission in tandem with the engine.

Within the scope of the invention, the design of the torque converter-mounted generator may vary widely. For example, the stator and rotor may be configured with a radial gap or an axial gap, in which case there may be two rotors concentrically arranged with the stator and axially spaced on either side of the stator. The stator may have windings and multi-phase power outputs. The rotor may include different sets of magnets.

A method of assembling powertrains includes installing a first torque converter-mounted generator on a first transmission of a first type, and operatively connecting a first configuration of power electronics to the first torque converter-mounted generator. The first torque converter-mounted generator and the first configuration of power electronics provide electrical power at least two different voltages. The method further includes installing a second torque converter-mounted generator on a second transmission of the first type, wherein the first transmission and the second transmission are substantially identical. The method further includes operatively connecting a second configuration of power electronics to the second torque converter-mounted generator. The second torque converter-mounted generator and the second configuration of power electronics provide electrical power voltages different than the two voltages provided by the first torque converter-mounted generator and the first configuration of power electronics. Notably, only one of the voltages provided by each of the powertrain embodiments need be different in order for the two voltages provided by each to be considered different (e.g., the first torque converter-mounted generator and first configuration of power electronics may offer a low voltage power of 28 volts direct current, just as the second torque converter-mounted generator and second configuration of power electronics does, but different higher voltage power (e.g., 220 volts direct current versus 270 volts direct current) may be provided by the two embodiments. Preferably, the assembly of the transmissions with the different torque converters may occur on the same assembly line in a factory. Thus, customer needs for different types of electrical power may be addressed as the powertrains are assembled.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
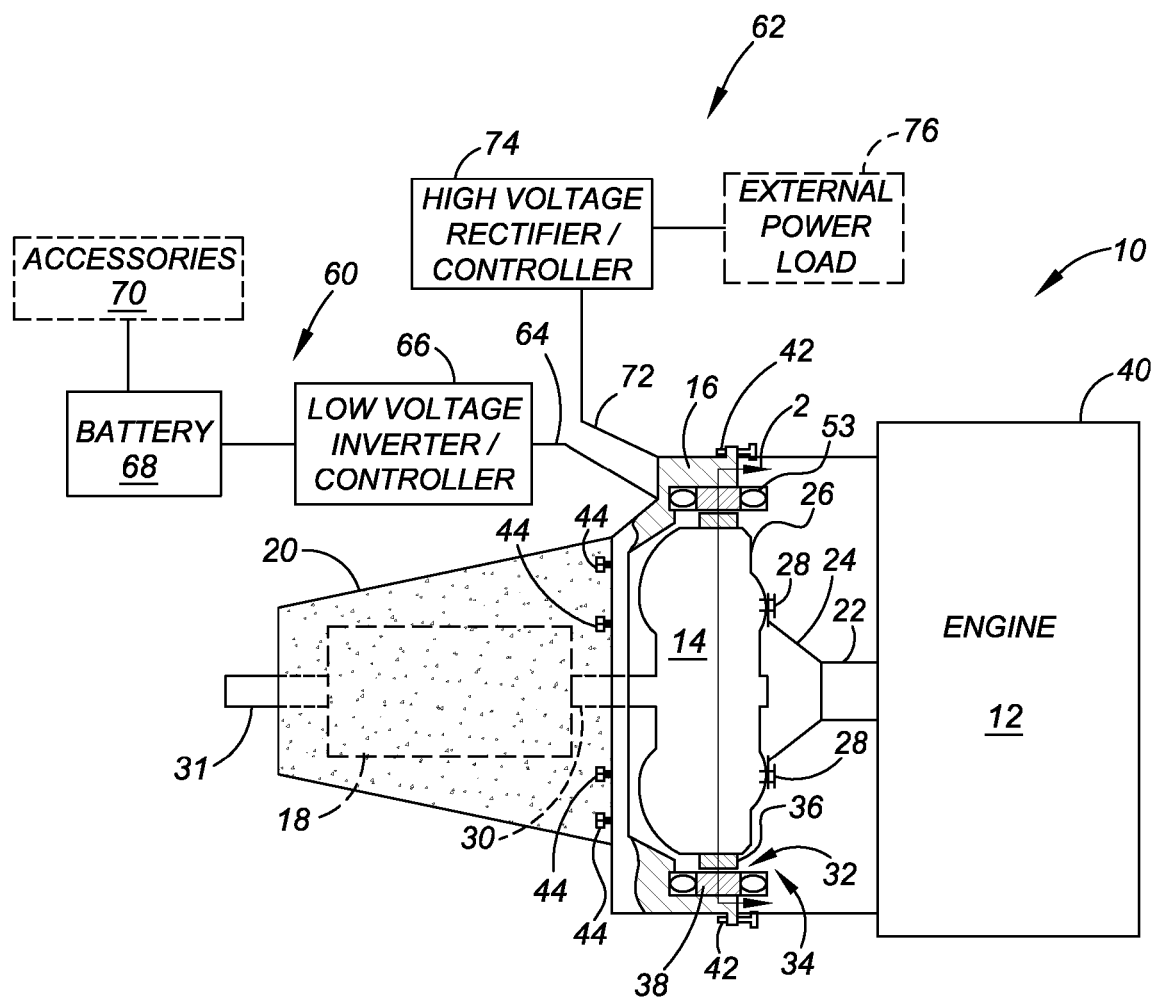
FIG. 1 is a schematic illustration in partial cross-sectional side view of a first powertrain including a transmission, and engine, a torque converter with a first type of generator mounted thereon, and power electronics, providing electrical power at two different voltages.

Referring to the drawings, wherein like reference numbers refer to like components, FIG. 1 shows a powertrain 10 that includes an engine 12, such as an internal combustion engine or a diesel engine. The powertrain 10 further includes a torque converter 14 housed within a torque converter housing 16 and a transmission 18 housed within a transmission housing 20. The engine crankshaft 22 is connected with an input shell 26 of the torque converter 14 via a flex plate 24 or other interface secured by bolts 28 or other fastening mechanisms to the torque converter input shell 26. As is known, the torque converter 14 forms a fluid coupling between the engine 12 and the transmission 18, providing torque multiplication via an impeller or pump portion rotating with the input shell 26 that forms a viscous coupling with a turbine portion rotating with an input member 30 of the transmission 18. The internal components of the torque converter 14, including the pump portion and turbine portion are well known and are not shown in FIG. 1. The torque converter 14 may be either stamped or machined steel or stamped aluminum. The transmission 18 utilizes intermeshing gears, such as planetary gear sets or gear planes in a countershaft arrangement, as well as selectively engagable torque-transmitting mechanisms, such as synchronizers, clutches and/or brakes, to establish torque transmission at various speed ratios to a transmission output member 31.

A torque converter-mounted generator 34 is provided that establishes, along with multiple sets of power electronics (discussed below) multiple power outputs for onboard and/or offboard power needs. The torque converter-mounted generator 34 includes a rotor 36 secured to the torque converter 14, specifically, to the torque converter input shell 26 for rotation therewith. The generator 34 further includes a stator 38 mounted to the torque converter housing 16 such that the stator 38 remains stationary with the torque converter housing 16. The rotor 36 and stator 38 are concentrically arranged about an axis of rotation of the engine crankshaft 22 and the transmission input member 30 and define a circumferential radial air gap 32 therebetween. The engine 12 includes an engine block 40 secured by bolts 42 or other fasteners to the torque converter housing 16. The torque converter housing 16 is also secured by bolts 44 or other fasteners to the transmission housing 20. The engine block 40, torque converter housing 16 and transmission housing 20 are stationary components. Preferably, the stator 38 is cooled by oil or water coolants in any known manner.

Figure 2:
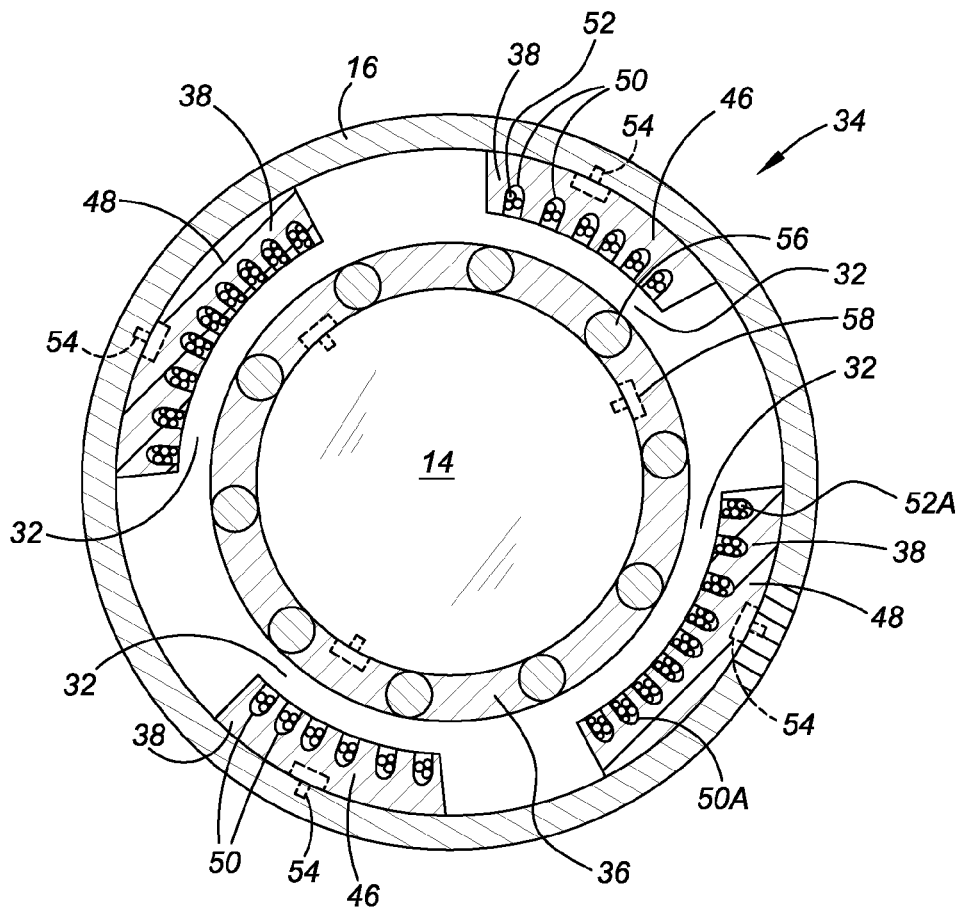
FIG. 2 is a schematic cross-sectional illustration of the torque converter-mounted generator of FIG. 1.

Referring to FIG. 2, the torque converter-mounted generator 34 is shown in cross-sectional view at the arrows indicated in FIG. 1. In this view, it is evident that the stator 38 is actually comprised of different stator segments, including a first set of stator segments 46 and a second set of stator segments 48. The first set of stator segments 46 includes interpole slots 50 in which three-phase stator windings 52 are nested. The stator windings 52 form end turns 53 visible in FIG. 1. The number of segments in the first set of stator segments 46 and the number of windings 52 is exemplary only in FIG. 2, and is selected to achieve a desired first output voltage, as discussed below. The second set of stator segments 48 includes interpole slots 50A in which three-phase stator windings 52A are nested. The stator windings 52A also form end turns, although these are not visible in the cross-section of the generator 34 taken in FIG. 1. The number of segments in the second set of stator segments 48 and the number of windings 52A are also selected to achieve a second desired output voltage, different than the first output voltage, as discussed below. The stator segments 46, 48 are bolted or otherwise secured to the torque converter housing 16 with bolts 54 as indicated.

The rotor 36 of the torque converter-mounted generator 34 has magnets 56 circumferentially spaced therearound. The number of magnets 56 is selected to optimize the desired first and second output voltages. The rotor 36 is secured with bolts 58 or any other fastening method to the torque converter 14 so that it rotates with the torque converter 14. The bolts 58 are shown in an exemplary arrangement only, and may be of a different number, spacing, or location than that shown. The radial air gap 32 is shown between the stator segments 46 and 48, and the rotor 36.

When the engine crankshaft 22 turns, the input shell 26 and rotor 36 are turned. The magnetic flux of the rotating magnets 56 generates current flow in the windings 52 and 52A of stator 38.

Referring again to FIG. 1, the powertrain 10 incorporates power electronics; specifically, a first set of power electronics 60 in electrical communication with the first set of stator segments 46 as well as a second set of power electronics 62 in electrical communication with the second set of stator segments 48. Together, the first and second types of power electronics 60, 62 may be referred to as a first configuration of power electronics. The first set of stator segments 46 and the first set of power electronics 62 are configured to provide electrical power at a first voltage, such as a relatively low 28 volt direct current (VDC). The second set of stator segments 48 and the second set of power electronics 62 are configured to provide electrical power at a second voltage, such as a relatively high 270 volt direct current. The first set, or lower voltage, power electronics 60 includes a first power connection 64 connected with the first set of stator segments 52 which can function as a first power output, The first power connection 64 communicates power to a low voltage power module 66, which includes an inverter and electronic controller. The low voltage power module 66 is operable to convert the three-phase alternating current provided by the first set of stator segments 52 into power in the form of 28 volt direct current to be stored in a low voltage battery 68. The controller function of the power module 66 directs the battery 68 to provide energy to vehicle accessories 70 configured to function on power at the low voltage (e.g., 28 Volt) level. The vehicle accessories 70 may include air conditioning, audio systems, and any other onboard or offboard electrically-powered components designed to run on the low voltage power provided by the first set of power electronics.

The second set of power electronics 62 includes a second power connection 72 that connects to the second set of stator segments 48 and functions as a second power output for the second, higher voltage, type of electrical power. The second power connection 72 communicates power to a high voltage rectifier and controller module 74 which functions as an export power rectifier and controller. The high voltage rectifier and controller module 74 is operable to convert the three-phase alternating current provided by the three-phase stator windings 52A into power in the form of 270 volt direct current that is provided to an external power load 76 under the control of the controller portion of the high voltage rectifier and controller module 74. The external power load 76 may include, for example, offboard industrial and utility equipment or tools, or an onboard load, such as refrigeration for a trailer in transit.

Figure 4:
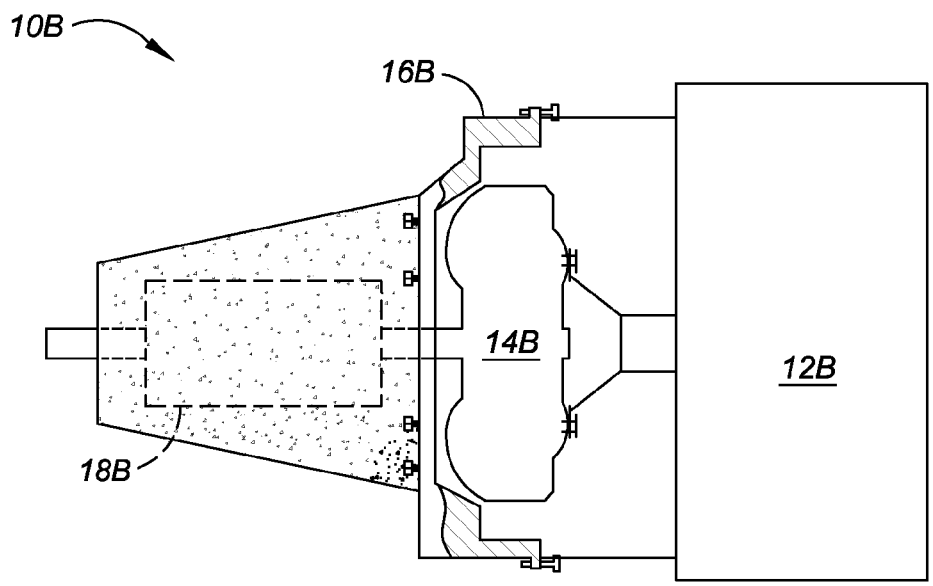
FIG. 4 is a schematic illustration of a third powertrain including a transmission and an engine identical to those of FIG. 3, and a torque converter without a generator mounted thereon.
Figure 3:
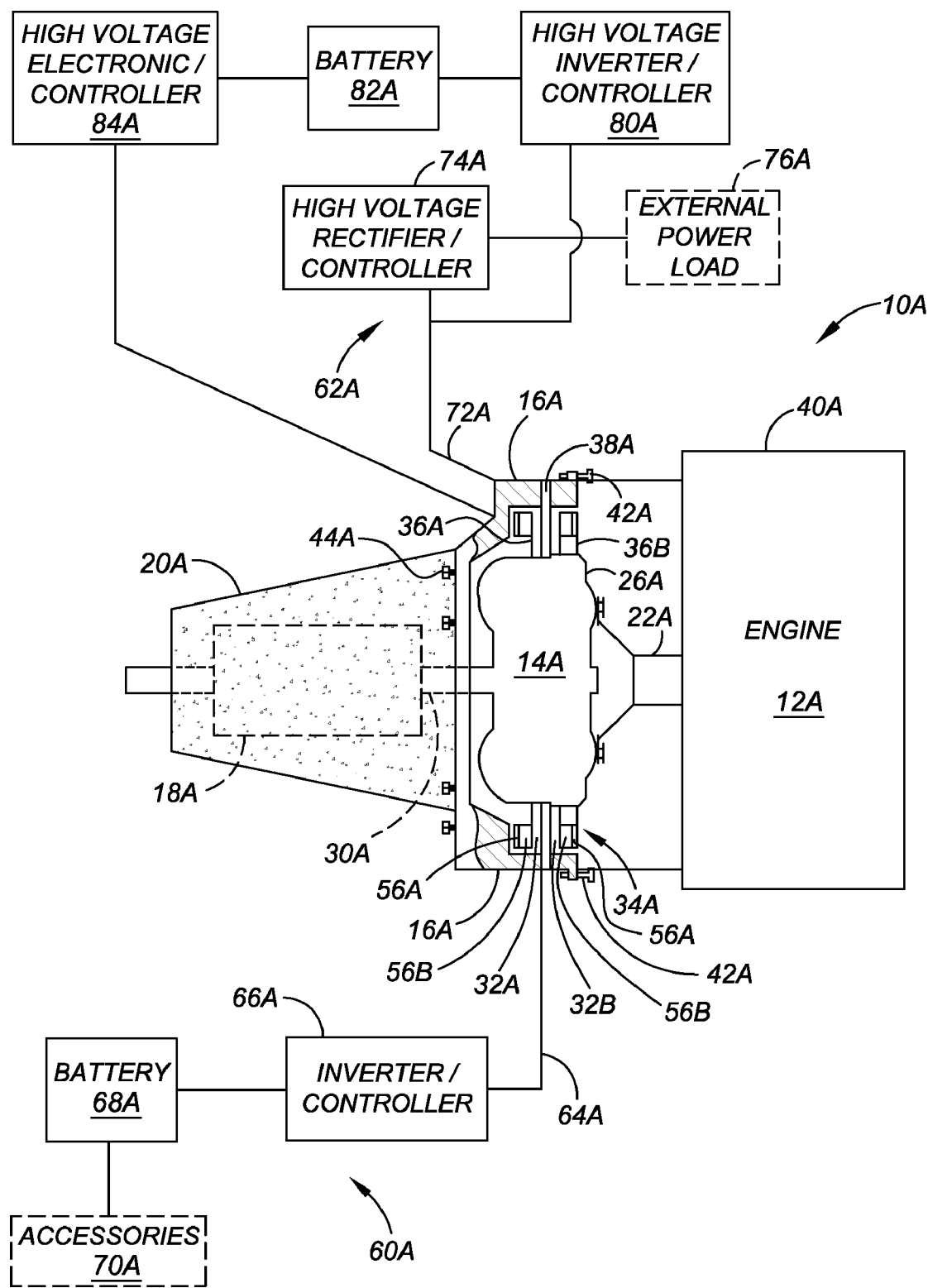
FIG. 3 is a schematic illustration in partial cross-sectional side view of a second powertrain including a transmission of the same type of the transmission of FIG. 1, an engine of the same type as the ending of FIG. 1, and a torque converter with a second type of generator mounted thereon, and power electronics, providing electrical power at voltages different than the voltages provided by the generator of FIGS. 1 and 2.

Referring to FIG. 3, a second embodiment of a powertrain 10A illustrates a second type of torque converter-mounted generator 34A utilized with an engine 12A and transmission 18A interconnected in the same manner as the corresponding components of FIG. 1. In fact, the engine 12A is an identical type engine as engine 12 and the transmission 18A is an identical type transmission as the transmission 18. In the powertrain 10A however, the torque converter-mounted generator 34A is of a different configuration, providing different voltage outputs, than the torque converter-mounted generator 34. Thus, a transmission manufacturer can offer the transmission represented as 18 in FIG. 1 and 18A in FIG. 3, modified according to a customer's specific power output needs, by choosing one of the torque converter-mounted generators 34 or 34A, designed with customized low and high voltage outputs. Additionally, the transmission 18A may also be offered with a traditional torque converter 14B, i.e., one without a generator mounted thereon, as illustrated in FIG. 4, as the traditional torque converter 14B and the torque converters with generators mounted thereon 14, 14A, occupy essentially the same axial packaging space, with only a different torque converter housing required for each different design.

The engine 12A includes an engine block 40A secured by bolts 42A or other fasteners to the torque converter housing 16A. The torque converter housing 16A is also secured by bolts 44A or other fasteners to the transmission housing 20A. The engine block 40A, torque converter housing 16A and transmission housing 20A are stationary components.

Referring in more detail to FIG. 3, the torque converter-mounted motor generator 34A is an axial gap air core generator that includes a stator 38A mounted to the torque converter housing 16A such that the stator 38A remains stationary with the torque converter housing 16A. The stator 38A includes multiple stator segments, circumferentially-spaced similar to those of FIG. 3, allowing multiple stator segments for multiple voltage outputs at the same time with separate output terminals, as discussed below. The torque converter-mounted generator 34A also includes a first rotor 36A and a second rotor 36B secured to the torque converter 14A, specifically, to the torque converter input shell 26A for rotation therewith. The rotors 36A, 36B and stator 38A are concentrically arranged about an axis of rotation of the engine crankshaft 22A and the transmission input member 30A, with the stator 38A sandwiched between the rotors 36A, 36B such that axial air gaps 32A, 32B are defined between each of the rotors 36A, 36B and the stator 38A, respectively. Each rotor has two sets of magnets 56A and 56B spaced circumferentially therearound, each set being characterized by different strengths, inducing different current flow in the axial core windings of the stator 38A. Different voltage outputs associated with the magnets 56A, 56B are utilized to provide different types of power for onboard and/or offboard use, as described below. Those skilled in the art readily understand the construction of axial gap air core generators.

The powertrain 10A incorporates a first set of power electronics 60A in electrical communication with the stator 38A via a first power connection 64A. The first set of power electronics 60A is configured for a first electrical power voltage, such as a lower voltage 24 volt direct current (VDC). The first set of power electronics 60A includes a low voltage power module 66A, including an inverter and an electronic controller, and a low voltage battery 68A operatively connected to vehicle accessories 70A. The components of the first set of power electronics 60A are configured and function similar to those like components of the first set of power electronics 60 of the powertrain 10 of FIG. 2, except that the low voltage power module provides 24 volt direct current to the battery 68A.

The powertrain 10A also incorporates a second set of power electronics 62A in electrical communication with the stator 38A via a second power connection 72A. Together the first and second sets of power electronics 60A, 62A, may be referred to as a second configuration of power electronics. The second set of power electronics 60A is configured for a second electrical power voltage, such as a higher voltage 220 volt direct current. The second power connection 72A communicates power to a high voltage rectifier and controller module 74A which functions as an export power rectifier and controller. The high voltage rectifier and controller module 74A is operable to convert three-phase 220 volt alternating current provided by the stator 38A into power in the form of 220 volt direct current that is provided to an external power load 76A under the control of the controller portion of the high voltage rectifier and controller module 74A. The external power load 76A may include, for example, offboard industrial and utility equipment of tools, or an onboard load, such as refrigeration for a trailer in transit. These components of the second set of power electronics 62A are configured and function similar to those like components of the second set of power electronics 62 of the powertrain 10 of FIG. 1, except that the high voltage rectifier and controller module 74A provides power at 220V to the external power load 76A.

The second set of power electronics 62A also includes componentry enabling the torque converter-mounted generator 34A to function as a motor to start the engine 12A or to provide power in tandem with the engine 12A to the transmission 18A, providing hybrid propulsion capability. Thus, the torque converter-mounted generator 34A may be referred to as a motor/generator. Specifically, the second set of power electronics 62A includes a high voltage alternating current to direct current power module 80A that functions as a power inverter and as an electronic controller to invert power from a high voltage alternating current, such as 220 volts alternating current, to a high voltage direct current, such as 220 volts direct current. The high voltage direct current is then stored in a high voltage battery 82A. A high voltage electronic controller 84A is configured to direct stored energy from the battery 82A to the stator 38A when operating conditions warrant starting the engine 12A, or when the engine 12A is already powering the transmission 18A and additional torque is required and may be provided by the motor/generator 34A. It should be appreciated that the direct current power module 80A, the battery 82A and the high voltage electronic controller 84A may also be employed on the powertrain 10 of FIG. 2 such that the torque converter-mounted generator 34 could also function as a motor.

As indicated in FIGS. 2 and 3, different powertrains may be constructed with the same type of transmission and engine, but with different torque converter-mounted generators connected therebetween. The choice of torque converter-mounted generator in terms of the power outputs it is configured to provide may be driven by specific customer needs. Alternatively, if onboard or offboard power is not required for a specific powertrain implementation, a powertrain 10B, configured as shown in FIG. 4, may be provided with an engine 12B, a transmission 18B and a torque converter 14B, within a torque converter housing 16B, that is not equipped with a generator. The engine 12B may be of the same type as engines 12 and 12A, and the transmission 18B may be of the same type as transmissions 18 and 18A.

Preferably, the power outputs of the various generators 34, 34A are common and the power electronics 60, 62, 60A, 62A are common, so that the generators and power electronics can be used for various different types of transmissions as well. Various power electronic configurations, including those of the following electric power voltages, are preferably available for connection to the common power outputs of the generators 34, 34A: 600 Volts DC, 12 Volts DC, 42 Volts DC, 110/220 Volts (60 Hz) alternating current "AC", 220 Volts (50 Hz AC), 24 Volts DC and 270 Volts DC.

Accordingly, a method of assembling powertrains, described with respect to the powertrain embodiments of FIGS. 1-4, includes installing a first torque converter-mounted generator 34 on a first transmission 18 of a first type. This may include attaching a torque converter housing 16 to a transmission housing 20. The method further includes operatively connecting a first configuration of power electronics 60, 62 to the first torque converter-mounted generator 34. The first torque converter-mounted generator 34 and the first configuration of power electronics 60, 62 provide electric power at least two voltages (e.g., 28 VDC and 270 VDC).

The method also includes installing a second torque converter-mounted generator 34A on a second transmission 18A of the first type that is substantially identical to the first transmission 18. This may include attaching a different torque converter housing 16A to a transmission housing 20A that is identical to the transmission housing 20. The method then includes operatively connecting a second configuration of power electronics 60A, 62A, to the second torque converter-mounted generator 34A. The second torque converter-mounted generator 34A and the second configuration of power electronics 60A, 62A provide electric power at voltages different than the two voltages provided by the first torque converter-mounted generator 34 and the first configuration 60, 62 of power electronics. Within the scope of the method, a torque converter 14B that does not have a generator mounted thereon may be connected with a transmission 18B identical to the transmissions 18 and 18A and with an engine 12B identical to the engines 12 and 12A. Thus, the method enables a given transmission and engine combination to be connected with different torque converters (with different types of generators, a motor/generator, or no generator mounted thereto) and different power electronic configurations (or no power electronics in the case of a torque converter without a generator) to meet a customer's specific electrical power needs.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
    a transmission housed within a transmission housing;
    a torque converter operatively connected with the transmission and housed within a torque converter housing; wherein the torque converter housing is secured to the transmission housing;
    a generator having a rotor secured to the torque converter and a stator secured to the torque converter housing;
    power electronics operatively connected with the generator;
    wherein the generator and power electronics are configured to provide electrical power at multiple voltage levels; wherein the generator generates electrical power at at least two different voltage levels; wherein the stator includes first and second sets of stator segments; and wherein the first and the second sets of stator segments each have one of a respective different number of windings and a respective different number of segments to provide a different one of the at least two different voltage levels.

2. The powertrain of claim 1, wherein the stator includes multi-phase power outputs.

3. The powertrain of claim 1, further comprising:
    an engine operatively connected to the torque converter for powering the transmission;
    wherein said power electronics are configured to provide electrical power to said stator to drive said rotor, thereby operating the generator in a motoring mode for at least one of starting the engine and providing power to the transmission in tandem with the engine.

4. The powertrain of claim 1, wherein the rotor and the stator are concentrically arranged to define a radial gap therebetween.

5. The powertrain of claim 1, wherein the rotor and the stator are concentrically arranged to define an axial gap therebetween.

6. The powertrain of claim 5, wherein the rotor is a first rotor and the axial gap is a first axial gap, and further comprising:
    a second rotor concentrically arranged with the stator to define a second axial gap therebetween; wherein the stator is arranged axially between the first rotor and the second rotor.

\* \* \* \* \*